US011772181B2

(12) United States Patent
Aberg et al.

(10) Patent No.: US 11,772,181 B2
(45) Date of Patent: *Oct. 3, 2023

(54) ARC STOP

(71) Applicant: ESAB AB, Gothenburg (SE)

(72) Inventors: Per Aberg, Laxa (SE); Johan Toftling, Forsvik (SE); Mikael Pettersson, Gothenburg (SE); Jakob Lennartsson, Gothenburg (SE)

(73) Assignee: ESAB AB, Gothenburg (SE)

( * ) Notice: Subject to any disclaimer, the term of this patent is extended or adjusted under 35 U.S.C. 154(b) by 590 days.

This patent is subject to a terminal disclaimer.

(21) Appl. No.: 16/983,166

(22) Filed: Aug. 3, 2020

(65) Prior Publication Data
US 2020/0361015 A1 Nov. 19, 2020

Related U.S. Application Data

(63) Continuation of application No. 15/683,947, filed on Aug. 23, 2017, now Pat. No. 10,730,131.
(Continued)

(51) Int. Cl.
B23K 9/095 (2006.01)
B23K 10/00 (2006.01)
B23K 9/067 (2006.01)

(52) U.S. Cl.
CPC ............ *B23K 9/0956* (2013.01); *B23K 9/067* (2013.01); *B23K 9/095* (2013.01); *B23K 10/006* (2013.01)

(58) Field of Classification Search
CPC ..... B23K 9/0956; B23K 9/067; B23K 10/006
See application file for complete search history.

(56) References Cited

U.S. PATENT DOCUMENTS 4,492,841 A   1/1985 Delius
6,023,046 A   2/2000 Holverson et al.
(Continued)

FOREIGN PATENT DOCUMENTS

CN   103764329 A   4/2014
CN   104148779 A   11/2014
(Continued)

OTHER PUBLICATIONS

Examination Report No. 1 for Australian Patent Application No. 2020286241 dated Nov. 22, 2021, 6 pages.
(Continued)

Primary Examiner — Geoffrey S Evans
(74) Attorney, Agent, or Firm — Edell, Shapiro & Finnan, LLC

(57) ABSTRACT

Various embodiments may be generally directed to a welding system that monitors an output of the welding system to determine if an output arc should be extinguished or maintained. The welding system can compare an arc voltage output to a voltage threshold and a temporal threshold. When the arc voltage output exceeds the voltage threshold in an uninterrupted manner for the duration of the temporal threshold, an output weld current can be stopped. In turn, the output arc can be broken or extinguished. After a predetermined amount of time, the power source can be re-engaged to prepare for re-ignition of another arc. By tracking the amount of time the arc voltage output exceeds the predetermined threshold, a probability of unwanted arc outs can be reduced or minimized while still providing quick and reliable arc breaking when desired.

20 Claims, 2 Drawing Sheets

Related U.S. Application Data

(60) Provisional application No. 62/382,019, filed on Aug. 31, 2016.

(56) References Cited

U.S. PATENT DOCUMENTS

| | | | |
|---|---|---|---|
| 7,820,943 B2 | 10/2010 | Beistle et al. | |
| 10,730,131 B2* | 8/2020 | Aberg | B23K 9/095 |
| 2004/0020907 A1* | 2/2004 | Zauner | B23K 9/32 |
| | | | 219/130.21 |
| 2005/0061791 A1 | 3/2005 | Matus et al. | |
| 2007/0257015 A1* | 11/2007 | Fosbinder | B23K 9/1062 |
| | | | 219/130.21 |
| 2010/0108654 A1 | 5/2010 | Ulrich | |
| 2010/0308027 A1 | 12/2010 | Vogel | |
| 2012/0234803 A1 | 9/2012 | Liu | |
| 2015/0014283 A1 | 1/2015 | Peters | |
| 2015/0114940 A1 | 4/2015 | Hutchison | |
| 2015/0158109 A1 | 6/2015 | Chantry | |
| 2015/0306693 A1 | 10/2015 | Peters | |
| 2016/0144444 A1 | 5/2016 | Davidson et al. | |

FOREIGN PATENT DOCUMENTS

| | | |
|---|---|---|
| EP | 2594119 | 5/2013 |
| JP | 2004188430 A | 7/2004 |
| JP | 2009291812 A | 12/2009 |

OTHER PUBLICATIONS

First Office Action for Chinese Patent Application No. 201780052316.7 with English translation, dated Jul. 31, 2020, 16 pages.

Office Action for Canadian Patent Application No. 3,033,842 dated Feb. 3, 2020, 6 pages.

Examination Report No. 1 for Australian Patent Application No. 2017318643 dated Dec. 9, 2019, 3 pages.

International Search Report and Written Opinion from PCT/IB2017/055115 dated Jan. 18, 2018.

International Search Report and Written Opinion from PCT/IB2017/055160 dated Dec. 20, 2017.

International Search Report and Written Opinion for corresponding PCT application No. PCT/IB2017/055118 dated Dec. 1, 2017.

Office Action for Chinese Patent Application No. 201780052316.7 with English translation, dated Mar. 24, 2021, 17 pages.

\* cited by examiner

ARC STOP

CROSS-REFERENCE TO RELATED APPLICATIONS

This application is a continuation of U.S. patent application Ser. No. 15/683,947, filed on Aug. 23, 2017, which claims the benefit of U.S. Provisional Patent Application No. 62/382,019, filed on Aug. 31, 2016, the disclosure of which is incorporated by reference herein in its entirety.

TECHNICAL FIELD

The present embodiments are related to power supplies for welding type power, that is, power generally used for welding, cutting, or heating.

BACKGROUND

Often, during a welding process, a welder may deliberately retract an electrode from a workpiece. In some instances, the welder may retract the electrode from the workpiece so as to control a weld pool (e.g., a temperature of a weld puddle). Under such a scenario, the welder may not want the retraction of the electrode to cause the output arc to break or extinguish. That is, certain retractions of the electrode from the workpiece may be intended to be a short break in the welding process. In other instances, the welder may retract the electrode from the workpiece with the intention to cause the output arc to break. Under such a scenario, the welder expects the output arc to break.

Many conventional welding systems are not capable of distinguishing a welder's movement of the electrode relative to the workpiece as being a short break in the welding process or as being a first step towards deliberately breaking the output arc. As a result, many conventional welding systems are simply designed to attempt to maintain the arc during any retraction of the electrode by the welder. These conventional welding systems consequently adjust operation to maintain the arc in such circumstances, resulting in a long arc that can be detrimental to the welding process and weld quality. These shortcomings are common in conventional manual metal arc welding (MMA) systems during MMA welding processes.

It is with respect to these and other considerations that the present disclosure is provided.

SUMMARY OF THE INVENTION

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments may be generally directed to a welding system that monitors an output of the welding system to determine if an output arc should be extinguished or maintained. The welding system can compare an arc voltage output to a voltage threshold and a temporal threshold. When the arc voltage output exceeds the voltage threshold in an uninterrupted manner for the duration of the temporal threshold, an output weld current can be stopped. In turn, the output arc can be broken or extinguished. After a predetermined amount of time, the power source can be re-engaged to prepare for re-ignition of another arc. By tracking the amount of time the arc voltage output exceeds the predetermined threshold, a probability of unwanted arc outs can be reduced or minimized while still providing quick and reliable arc breaking when desired.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DESCRIPTION OF EMBODIMENTS

Figure 1:
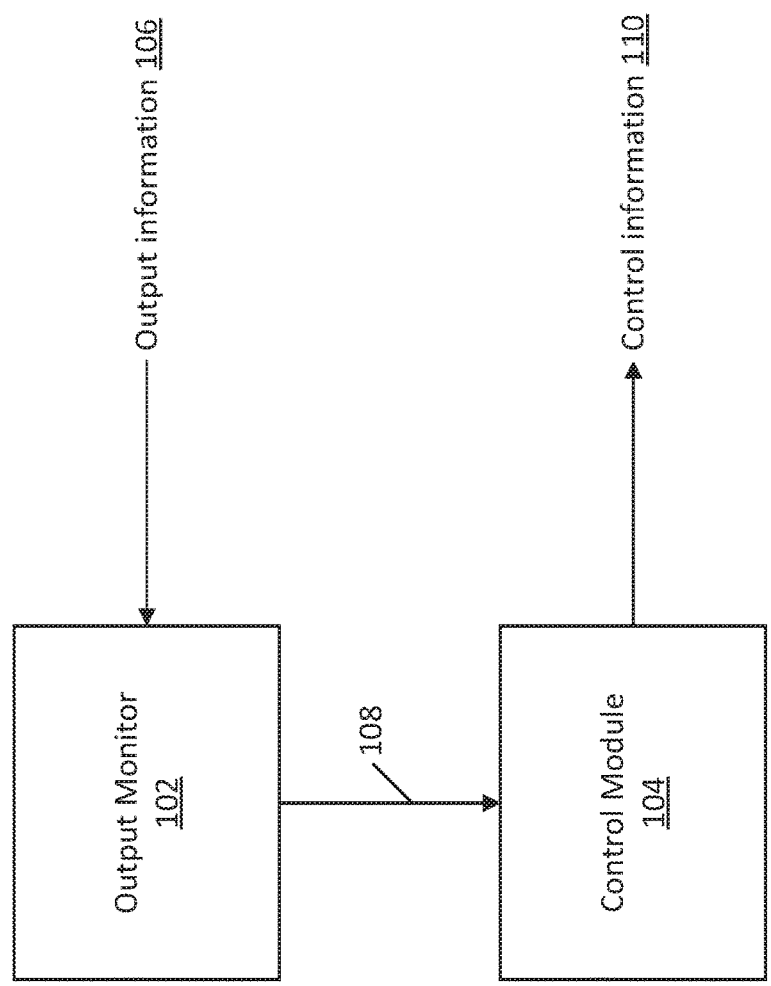
FIG. 1 illustrates a welding system.

FIG. 1 illustrates a portion of a welding system 100 for managing an output based on the arc management techniques described herein. The welding system 100 can be used for a variety of welding processes including, for example, MMA welding processes. The welding system 100 can reduce unwanted arc outs and can provide reliable and quick arc breaking when desired by a welder using the welding system 100.

As shown in FIG. 1, the welding system 100 can include an output monitor 102 and a control module 104. The control module 104 can be coupled to the output monitor 102. The output monitor 102 can receive output information 106. The output information 106 can be information related to an output of a welding machine such as, for example, output current, output voltage, and/or output power. The output information 106 can be provided to the output monitor 102 from one or more output sensors of the welding machine.

Based on the received output information 106, the output monitor 102 can monitor a welding process being implemented by a welder and can determine when an arc is desired to be extinguished or maintained by the welder. That is, the output monitor 102 can be provided with information (e.g., the output information 106) to enable the output monitor 102 to predict when an output arc should be maintained or when an output arc should be extinguished.

In various embodiments, the output monitor 102 can monitor and/or filter an output voltage over time during a welding process (e.g., an MMA welding process). The output monitor 102 can observe the output voltage over time (e.g., as indicator of output arc voltage) and can compare the output voltage to a predetermined threshold. As an example, when the output voltage (e.g., as indicated in the received output information 106) exceeds the predetermined threshold for a predetermined amount of time, the output monitor 102 can determine that the output arc is to be broken and/or extinguished. When the output voltage fails to exceed either the predetermined arc voltage threshold or the predetermined time threshold, then the output monitor 102 can determine that the output arc is to be maintained.

By comparing the output arc voltage to a voltage threshold level as well as by tracking a temporal threshold, the output monitor 102 can better distinguish when an electrode has been retracted by a welder with the goal of breaking the arc compared to when the electrode has been retracted as only part of a short break in the welding process (i.e., where an arc break is not desired by the welder).

When the predetermined arc voltage threshold has been exceeded for the predetermined amount of time, the output monitor 102 can determine that the arc is to be broken. In response, the output monitor 102 can provide a signal 108 to the control module 104 indicating the same. Specifically, the output monitor 102 can provide the signal 108 to the control module 104 that can provide a continuous update of the output. The control module 104 can use information provided by the output monitor 102 to govern operation of the welding system 100. For example, the control module 104 can determine if the welding system 100 is to be operated to maintain an output arc or if the arc is to be broken. The control module 104 can provide control information 110 to control operation of the welding system 100. The control information 110 can be provided to other constituent components of the welding system 100 (not depicted in FIG. 1 for simplicity). The control information 110 can cause an output arc to be maintained or broken. For example, the control information 110 can cause an output welding current to be stopped or no longer provided.

The arc voltage threshold and time threshold used by the output monitor 102 can be established such that when the thresholds are exceeded the output weld current can be immediately cut off. The arc voltage threshold and time threshold (which together can be considered to be filter parameters used by the output monitor 102) can be adjusted and varied for different types of welding. Overall, these filter parameters can be optimized so that the welding system 100 can operate with a reduced or minimal probability of unwanted arc outs and while also providing reliable and fast arc breaking. Further, the output monitor 102 and the control module 104 can operate such that when an arc is extinguished, the power source of the welding system 100 can supply voltage to the output again after a few milliseconds to be ready for ignition to start a next weld.

The output monitor 102 can implement filtering/monitoring of the output that can be varied and/or fine-tuned for a number of processes and operational conditions. Specifically, the arc voltage threshold and temporal threshold described above can each be adjusted or varied either automatically or based on user input. The filter parameters can be varied based on a type of welding process implemented by the welding system 100 and/or a particular user of the welding system 100. The filter parameters can be adjusted based on different current ranges such that relatively higher operational currents are associated with a first set of filter parameters and relatively lower operational currents are associated with a second, different set of filter parameters. The filter parameters can also be adjusted based on the type of accessory equipment (e.g., consumables) used during a particular process—such as, for example, a type of electrode or workpiece being welded.

The filter parameters can also be varied based on additional output information including, for example, an output power and/or output current. Further, the filter parameters can be adjusted on a static basis or a dynamic basis. That is, the filter parameters can be set or modified before and after a particular welding process (e.g., maintained as fixed or set during the entirety of a welding process) or can be adjusted continuously on the fly during the welding process (i.e., dynamically as conditions may change during a welding process).

The filter parameters can also be varied based on the type of material being welded. For example, it may be desirable to break or extinguish an arc differently based on different types of material. For certain types of materials, a lower or higher output may or may not be tolerable prior to ending an arc. If an output voltage in the ending stage of an arc is too high, then for some materials the result can be a long and dancing arc, which can introduce problems with the quality and reliability of the weld. Accordingly, filter parameters can be based on the types of materials to be welded. The type of material being welded can be provided to the welding system 100 (e.g., through user input) or can be automatically determined. In various embodiments, a machine vision system and/or other material detection system can be used by the welding system 100 to determine a type of material to be welded such that the filter parameters can be adjusted based on knowledge of the same.

Figure 2:
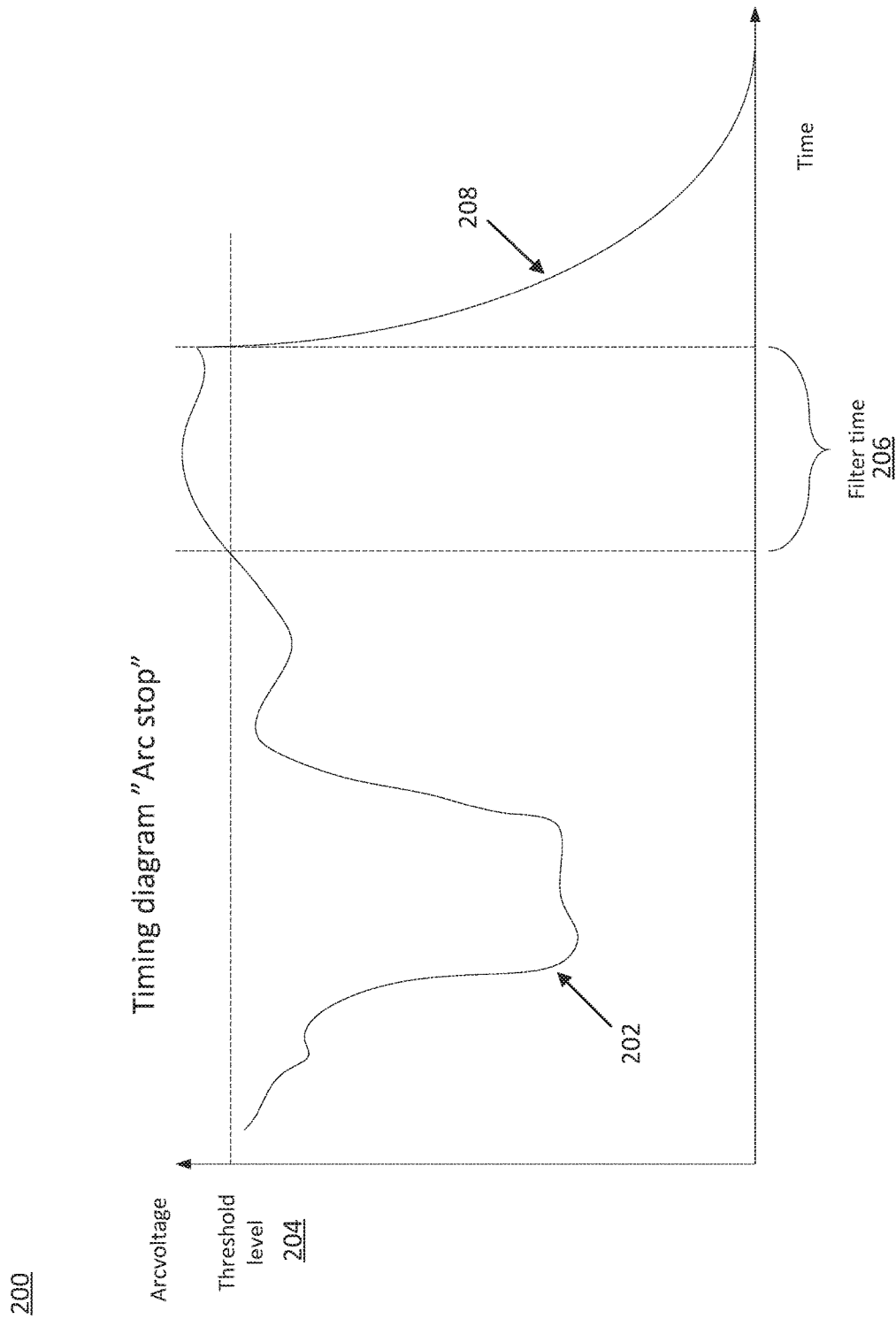
FIG. 2 illustrates an exemplary output monitoring technique implemented by the welding system depicted in FIG. 1.

FIG. 2 illustrates an exemplary monitoring/filtering process 200 according to techniques described herein. The monitoring/filtering process 200 can be implemented by the welding system 100 depicted in FIG. 1.

As shown in FIG. 2, an output 202 of a welding system can be tracked or monitored. The output 202 can be an arc voltage output of a welding power supply. The arc voltage 202 can be monitored continuously over time as indicated in FIG. 2.

Two monitoring/filter parameters are shown in FIG. 2. The first parameter 204 can be a threshold parameter value. The threshold parameter 204 can be an arc voltage threshold level or value. As shown in FIG. 2, the arc voltage 202 can vary substantially over time and can have a value greater than or less than the arc voltage threshold value 204.

A second parameter 206 can be a time threshold 206. The time threshold 206 can be considered to be a temporal threshold or a filter time. Operation of a welding system in view of the techniques depicted in FIG. 2 can be described as follows. When the arc voltage 202 exceeds the threshold level 204, a timer can begin. The timer can track how long the arc voltage 202 exceeds the threshold level 204. When the amount of time that the arc voltage 202 exceeds the threshold level 204 is greater than the filter time threshold 206, an arc stop or arc break can be initiated. Specifically, an output current can be stopped or blocked, such that the output arc is broken or extinguished. This is shown by the decay region 208 of the arc voltage 202. When the filter time threshold 206 has been met, a power source of the welding system can be shut down. As a result, the arc voltage 202 can diminish sharply (as shown by region 208). The output arc 202 can then be broken and/or extinguished. Subsequent to the decay region 208, the power source can be re-engaged so as to be ready to provide an output arc when instructed to do so. The amount of time between shutting down the power source and re-engaging the power source can be set to be approximately a few milliseconds with the delay time being configurable and adjustable based on a variety of factors.

As described above, the output threshold 204 and temporal threshold 206 can each be separately adjusted, configured, or modified statically or dynamically based on a number of factors including the welding process or even the particular user of a welding machine. By employing the monitoring/filtering mechanism described herein, unwanted arc breaks can occur less frequently while desired arc breaks can still be provided in a quick and reliable manner. Further, by providing the ability to adjust the output threshold 204 and the temporal threshold 206, a welding system can provide these benefits over a wide range of processes, users, current ranges, and operational conditions.

Overall, the techniques described herein provide for cutting or extinguishing an output arc when desired by a welder.

The output arc can be extinguished as desired based on the welder's movement of the electrode relative to the workpiece. The techniques described herein can continuously monitor the output of a welding system and can determine when to cut the output arc based on a number of parameters such as, for example, an output current, output voltage, and/or output power. The parameters can be viewed as filtering the observed output of the welding system to determine when to break an output arc (or alternatively when to maintain an arc) as the electrode is moved relative to the workpiece. The comparison of the adjustable parameters to the observed welding system output or use of the parameters in view of the welding system output can be implemented in a number of ways including, for example, through a filter or filter function. Filters such as a low pass filter of a first degree, a low pass filter of a higher degree, and/or a sum of different low pass filters can be used. Further, an input to the filters can itself be a mathematical function with any of the above-mentioned parameters used as variables.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

What is claimed is:

1. A method, comprising:
   monitoring an output arc voltage between a workpiece and a welding electrode of a welding system during a welding operation;
   determining that the welding electrode has been retracted from the workpiece by detecting that the output arc voltage has exceeded a voltage threshold level, indicating an increased arc length between the welding electrode and the workpiece;
   triggering a timer when the output arc voltage exceeds the voltage threshold level; and
   determining that the output arc between the workpiece and the welding electrode is to be extinguished and stopping an output weld current of the welding system in response to the output arc voltage continuously remaining above the voltage threshold level until a value of the timer exceeds a temporal threshold.

2. The method of claim 1, further comprising:
   determining that the welding operation is to be continued and maintaining the output arc with the output weld current in response to the output arc voltage falling below the voltage threshold level before the value of the timer exceeds the temporal threshold.

3. The method of claim 1, wherein the voltage threshold level and the temporal threshold are adjusted statically.

4. The method of claim 1, wherein the voltage threshold level and the temporal threshold are adjusted dynamically.

5. The method of claim 1, wherein the voltage threshold level and the temporal threshold are adjusted based on a composition of the workpiece.

6. The method of claim 1, wherein the voltage threshold level and the temporal threshold are adjusted based on an expected current range.

7. The method of claim 1, wherein the voltage threshold level and the temporal threshold are adjusted based on a kind of welding employed in the welding process.

8. The method of claim 7, wherein the kind of welding is Manual Metal Arc (MMA) welding.

9. The method of claim 1, wherein the voltage threshold level and the temporal threshold are adjusted based on an electrode used during a welding process.

10. The method of claim 1, wherein stopping the output weld current of the welding system comprises shutting down a power source.

11. The method of claim 10, wherein the power source is turned back on after a predetermined delay.

12. A method comprising:
    monitoring an output arc voltage between a workpiece and a welding electrode of a welding system during a welding operation;
    in response to the output arc voltage continuously exceeding a voltage threshold level for a period of time that exceeds a temporal threshold, determining that the welding electrode has been retracted from the workpiece with an intent to extinguish the output arc between the workpiece and the welding electrode, and stopping an output weld current of the welding system; and
    in response to the output arc voltage failing to continuously exceed the voltage threshold level for the temporal threshold, determining that the welding operation is to be continued and maintaining the output arc with the output weld current.

13. The method of claim 12, wherein the voltage threshold level and the temporal threshold are adjusted statically.

14. The method of claim 12, wherein the voltage threshold level and the temporal threshold are adjusted dynamically.

15. The method of claim 12, wherein the voltage threshold level and the temporal threshold are adjusted based on an expected current range.

16. The method of claim 12, wherein the voltage threshold level and the temporal threshold are adjusted based on a type of welding employed in the welding process.

17. A welding system, comprising:
    an output monitor coupled to a welding electrode connected to the welding system, the output monitor being configured to:
       monitor an output arc voltage between a workpiece and the welding electrode of the welding system during a welding operation; and
       determine that the welding electrode has been retracted from the workpiece by detecting that the output arc voltage has exceeded a voltage threshold level, indicating an increased arc length between the welding electrode and the workpiece; and
    a control module coupled to the output monitor and configured to:
       determine that the the output arc between the workpiece and the welding electrode is to be extinguished and stop the output weld current in response to the output arc voltage continuously exceeding the voltage threshold level for a period of time that exceeds a temporal threshold.

18. The welding system of claim 17, wherein the control module is further configured to:
  determine that the welding operation is to be continued and maintain the output arc with the output weld current in response to the output arc voltage failing to continuously exceed the voltage threshold level for a period of time that exceeds the temperal threshold.

19. The welding system of claim 17, wherein the voltage threshold level and the temporal threshold are adjusted based on an expected current range.

20. The welding system of claim 17, wherein the voltage threshold level and the temporal threshold are adjusted based on a kind of welding employed in the welding process.

* * * * *

UNITED STATES PATENT AND TRADEMARK OFFICE
CERTIFICATE OF CORRECTION

PATENT NO. : 11,772,181 B2
APPLICATION NO. : 16/983166
DATED : October 3, 2023
INVENTOR(S) : Per Aberg et al.

It is certified that error appears in the above-identified patent and that said Letters Patent is hereby corrected as shown below:

In the Claims

Claim 17, Column 6, Line 62, replace "determine that the the output arc between the work-" with
-- determine that the output arc between the workpiece --

Signed and Sealed this
Nineteenth Day of December, 2023

*Katherine Kelly Vidal*
Director of the United States Patent and Trademark Office